(12) United States Patent
Lu et al.

(10) Patent No.: US 12,100,233 B2
(45) Date of Patent: Sep. 24, 2024

(54) COMPUTER IMPLEMENTED METHOD FOR SEGMENTING A BINARIZED DOCUMENT

(71) Applicant: VRIJE UNIVERSITEIT BRUSSEL, Brussels (BE)

(72) Inventors: Tan Lu, Lanzhou (CN); Ann Dooms, Denderleeuw (BE)

(73) Assignee: VRIJE UNIVERSITEIT BRUSSEL, Brussels (BE)

( * ) Notice: Subject to any disclaimer, the term of this patent is extended or adjusted under 35 U.S.C. 154(b) by 58 days.

(21) Appl. No.: 17/609,150

(22) PCT Filed: May 8, 2020

(86) PCT No.: PCT/EP2020/062909
§ 371 (c)(1),
(2) Date: Nov. 5, 2021

(87) PCT Pub. No.: WO2020/225430
PCT Pub. Date: Nov. 12, 2020

(65) Prior Publication Data
US 2022/0237932 A1    Jul. 28, 2022

(30) Foreign Application Priority Data

May 8, 2019 (EP) .................................. 19173367

(51) Int. Cl.
*G06K 9/00* (2022.01)
*G06T 7/155* (2017.01)
(Continued)

(52) U.S. Cl.
CPC ............ *G06V 30/413* (2022.01); *G06T 7/155* (2017.01); *G06V 10/54* (2022.01); *G06V 10/84* (2022.01);
(Continued)

(58) Field of Classification Search
CPC ...... G06V 30/413; G06V 10/54; G06V 10/84; G06V 30/148; G06V 30/18076; G06V 30/18133; G06T 7/155
See application file for complete search history.

(56) References Cited

U.S. PATENT DOCUMENTS 6,173,073 B1 *  1/2001  Wang ................... G06V 30/412
                                                      382/175
9,014,481 B1 *  4/2015  Luqman ............... G06V 30/245
                                                      382/185
(Continued)

FOREIGN PATENT DOCUMENTS

CA       2229326 A1 *  2/1998
JP    2017228297 A  *  12/2017
(Continued)

OTHER PUBLICATIONS

Page segmentation using minimum homogeneity algorithm and adaptive mathematical morphology, Tuan Anh Tran et al, Springer, 2016, pp. 191-209 (Year: 2016).*
(Continued)

*Primary Examiner* — Jayesh A Patel
(74) *Attorney, Agent, or Firm* — Kolitch Romano Dascenzo Gates LLC

(57) ABSTRACT

A computer-implemented method is disclosed for segmenting a binarized document. The method includes extracting connected components from the binarized document and discriminating (for at least one of the connected components) whether it is a text component based on a homogeneity level value. The homogeneity level value is representative of the level of homogeneity within the local region of the connected component. The local region includes the connected component and at least one adjacent connected component. The homogeneity level value is based on at least one value representative of at least one image characteristic
(Continued)

Extracting a plurality of connected components from a binarized document — Step 100

Determining the homogeneity level (PLTH) of each connected component by evaluating the regional layer homogeneity pattern on component layer — Step 110

For each connected component, discriminating whether said connected component is a text component or non-text component — Step 120 parameter determined for the connected component and on at least one value representative of the image characteristic parameter of the at least one adjacent connected component.

20 Claims, 5 Drawing Sheets

(51) Int. Cl.
- *G06V 10/54* (2022.01)
- *G06V 10/84* (2022.01)
- *G06V 30/148* (2022.01)
- *G06V 30/18* (2022.01)
- *G06V 30/413* (2022.01)
- *G06V 30/10* (2022.01)

(52) U.S. Cl.
CPC ...... *G06V 30/148* (2022.01); *G06V 30/18076* (2022.01); *G06V 30/10* (2022.01); *G06V 30/18133* (2022.01)

(56) References Cited

U.S. PATENT DOCUMENTS

| | | | |
|---|---|---|---|
| 9,646,202 B2 | 5/2017 | Abdollahian et al. | |
| 2003/0202696 A1* | 10/2003 | Simard | G06V 30/413 382/195 |
| 2005/0271275 A1* | 12/2005 | Chang | G06V 30/186 382/176 |
| 2009/0074291 A1* | 3/2009 | Iinuma | G06V 30/413 382/178 |
| 2009/0148042 A1* | 6/2009 | Fan | G06V 30/19013 382/176 |
| 2012/0120453 A1* | 5/2012 | Yu | H04N 1/40062 358/3.06 |
| 2016/0210523 A1* | 7/2016 | Abdollahian | G06V 30/40 |
| 2020/0159820 A1* | 5/2020 | Rodriguez | G06F 40/137 |

FOREIGN PATENT DOCUMENTS

| | | | | |
|---|---|---|---|---|
| KR | 1571681 B1 * | 11/2015 | | G06F 17/21 |
| KR | 101571681 B1 * | 11/2015 | | |

OTHER PUBLICATIONS

Recursive X-Y Cut using Bounding Boxes of Connected Components, Jaekyu Ha et al, IEEE, 1995, pp. 952-955 (Year: 1995).*

Multi-scale Techniques for Document Page Segmentation, Zhixin Shi et al., IEEE, 2005, pp. 1-5 (Year: 2005).*

Page Segmentation Techniques in Document Analysis, Koichi Kise, Springer, 2014, pp. 135-175 (Year: 2014).*

Page Segmentation and Classification Utilising Bottom-Up Approach, Dimitrios Drivas et al., IEEE, 1995, pp. 610-614 (Year: 1995).*

Document Layout Analysis: A Comprehensive Survey, Galal M. Binmakhashen et al., ACM, 2019, pp. 109-1 to 109-36 (Year: 2019).*

A Novel Method for Embedded Text Segmentation Based on Stroke and Color, Xiufei Wang et al., IEEE, 2011, pp. 151-155 (Year: 2011).*

Bayesian classifier for multi-oriented video text recognition system, Sangheeta Roy et al., ELSEVIER, 2015, pp. 5554-5566 (Year: 2015).*

International Search Report and Written Opinion of the International Searching Authority from the European Patent Office, in PCT/EP2020/062909 dated Nov. 6, 2020, which is an international application corresponding to this U.S. application.

Alpert, Sharon, et al.; "Image Segmentation by Probabilistic Bottom-Up Aggregation and Cue Integration"; obtained from IEEE Transactions on Pattern Analysis and Machine Intelligence, vol. 34, No. 2, Feb. 2012.

Lee, SeongHun et al.; "Integrating Multiple Character Proposals for Robust Scene Text Extraction"; obtained from Image and Vision Computing; Sep. 2013.

Nickels, Kevin M. et al.; "Textured Image Segmentation: Returning Multiple Solutions"; obtained at Image and Vision Computing; Oct. 1997.

Tran, Tuan Anh, et al.; "Page Segmentation Using Minimum Homogeneity Algorithm and Adaptive Mathematical Morphology"; obtained from the International Journal on Document Analysis and Recognition, vol. 19, No. 3; Mar. 2016.

O'Gorman, L.; "The Document Spectrum for Page Layout Analysis," IEEE Trans. Pattern Anal. Mach. Intell., vol. 15, No. 11, pp. 1162-1173, Nov. 1993.

* cited by examiner

COMPUTER IMPLEMENTED METHOD FOR SEGMENTING A BINARIZED DOCUMENT

TECHNICAL FIELD

The present disclosure is related to a computer implemented method for segmenting a binarized document, a method for OCRing a binarized document, as well as a data processing apparatus, a computer program and computer-readable medium.

INTRODUCTION

Document image segmentation methods are generally classified into three categories known as the bottom-up, top down and hybrid. Bottom-up methods follow an agglomerative approach where letters or words are first extracted and then merged progressively into text lines and text regions. The publication L. O. Gorman, "The Document Spectrum for Page Layout Analysis," IEEE Trans. Pattern Anal. Mach. Intell., vol. 15, no. 11, pp. 1162-1173, November 1993. proposes a connected component based method where each connected component is paired with its k nearest neighbors. By investigating the histogram of the magnitude and the angle of the pairing vectors, the within-line nearest neighbors are determined and text lines are subsequently extracted. Text lines are then merged into text blocks by checking their parallelness, perpendicular proximity and overlap. The strength of this method lies in the exploitation of the local neighborhoods of each connected component. However the neglection of text and non-text discrimination limits its performance when handling versatile layouts with varying font sizes. On the contrary, top-down methods start from the whole image and make use of global information (e.g. large foreground or background strips) to segment the image iteratively into smaller regions until region homogeneity is reached. Defined as the histogram of the accumulated foreground (or background) pixels in the horizontal or vertical direction across an image region, projection profiles are often employed in the segmentation process of a top-down method. Bottom-up methods are in general time consuming while top-down methods tend to suffer from non-Manhattan layouts. In view of these difficulties, hybrid methods strive to provide a constructive combination of bottom-up and top-down techniques. However, similar to bottom-up and top-down methods where a reliable text and non-text components classification is currently absent, the hybrid methods show limitations when dealing with documents with rich non-text components.

It is to note that text and non-text classification is a fundamental step in document segmentation and has been addressed using heuristics, simple statistics or learning based approaches in existing document segmentation methods. While the first two are straight-forward to implement, their performance tends to suffer from complicated documents where the layout versatility is beyond their rigid comprehension. On the other hand, the demand for sufficient training samples is stringent for learning based approaches which may be less favorable in practical scenarios where it is expensive to collect training samples for the classifier.

SUMMARY

The present disclosure aims to provide a solution to at least one drawback of the above prior art teaching. More specifically, the present disclosure aims to provide a solution to improve the segmentation of documents through extracting text regions from complex layouts.

According to an object of the present disclosure, there is therefore provided a computer implemented method for segmenting a binarized document. The solution of the present disclosure relies on the assumption that a discrimination between regular (e.g. text) and irregular (e.g. non-text) components is enabled by any one or a combination of proximity, similarity and regularity (e.g. symmetry) characteristics exhibited by regions surrounding the components. These attributes, alone or in combination, are advantageously used to define homogeneity as a pattern displayed by a region of regular components (e.g. text), which consists of proximately and regularly (e.g. symmetrically) arranged units with similar morphological and texture features. The discrimination according to the present disclosure improves the segmentation process differentiating text region from non-text region, or more generally, a region with a regular pattern from a region with an irregular pattern.

It is another object of the present disclosure to disclose the method as defined above, wherein the homogeneity level value for the at least one of the connected components is based on a comparison between the at least one value representative of the at least one image characteristic parameter determined for said connected component and on the at least one value representative of the at least one image characteristic parameter determined for the at least one connected component adjacent to said connected component.

It is another object of the present disclosure to disclose such a method as defined in any of the above, wherein the at least one image characteristic parameter for a given connected component comprises at least one morphological feature determined for the given component.

It is another object of the present disclosure to disclose such a method as defined in any of the above, wherein the at least one morphological feature determined for the given connected component is at least one coordinate of the smallest rectangle containing the region spanned by said component, an aspect ratio of said rectangle, an area of said rectangle, an extent of the binary image of said component, the Euler number of said component, a parameter related to the set of connected components vertically neighboring said component, a parameter related to the set of connected components horizontally neighboring said component, a direction of said component, or any combination thereof.

It is another object of the present disclosure to disclose such a method as defined in any of the above, wherein the at least one image characteristic parameter for a given connected component comprises at least one texture feature determined for the given connected component.

It is another object of the present disclosure to disclose such a method as defined in any of the above, wherein the at least one texture feature determined for the given connected component is based on a grey-level co-occurrence matrix determined for the given connected component.

It is another object of the present disclosure to disclose such a method as defined in any of the above, wherein the at least one texture feature determined for the given connected component is computed from a grey-level co-occurrence matrix determined using a region comprising the given connected component and one or more neighboring connected components of the given connected component.

It is another object of the present disclosure to disclose such a method as defined in any of the above, wherein the at least one texture feature determined for the given connected component is computed from a grey-level co-occurrence matrix determined using a region comprising periodic duplications of the given connected component.

It is another object of the present disclosure to disclose such a method as defined in any of the above, wherein the homogeneity level value is a likelihood that a connected component is a regular component, preferably a text component, more preferably a text character.

It is another object of the present disclosure to disclose such a method as defined in any of the above, wherein the homogeneity level value is a probabilistic description of the homogeneity pattern displayed in a region comprising a connected component and a set of neighboring connected components related to the said component.

It is another object of the present disclosure to disclose such a method as defined in any of the above, wherein the homogeneity level value is evaluated based on a probabilistic cue integration of the at least one image characteristic parameter determined for the at least one of the connected components and the at least one image characteristic parameter determined for the at least one connected component adjacent to the at least one of the connected components.

It is another object of the present disclosure to disclose such a method as defined in any of the above, wherein the probabilistic cue integration is based on least one prior probability characterizing the cue probability based on the at least one image characteristic parameter determined for the at least one of the connected components and the at least one image characteristic parameter determined for the at least one connected component adjacent to the at least one of the connected components.

It is another object of the present disclosure to disclose such a method as defined in any of the above, wherein the probabilistic cue integration is based on least one cue-specific distribution characterizing the cue-specific probabilistic homogeneity based on the at least one image characteristic parameter determined for the at least one of the connected components and the at least one image characteristic parameter determined for the at least one connected component adjacent to the at least one of the connected components.

It is another object of the present disclosure to disclose such a method as defined in any of the above, wherein the at least one cue-specific probabilistic homogeneity is characterized using the Bayesian rule based on the at least one likelihood of observing the at least one image characteristic parameter from the at least one of the connected components and the at least one image characteristic parameter from the at least one connected component adjacent to the at least one of the connected components conditioned on the homogeneity status of the two components.

It is another object of the present disclosure to disclose such a method as defined in any of the above, wherein the at least one cue-specific probabilistic homogeneity is characterized using the Bayesian rule based on the at least one cue-specific prior probability of the homogeneity between the at least one image characteristic parameter from the at least one of the connected components and the at least one image characteristic parameter from the at least one connected component adjacent to the at least one of the connected components.

It is another object of the present disclosure to disclose such a method as defined in any of the above, wherein a given connected component is discriminated to be a regular component, preferably a text component, more preferably a text character, when the homogeneity level value of the given connected component is higher than a predefined threshold.

It is another object of the present disclosure to disclose such a method as defined in any of the above, wherein a given connected component is discriminated to be a non-regular component, preferably a non-text component, more preferably a non-text character, when the homogeneity level value of the given connected component is below than or equal to the predefined threshold.

It is another object of the present disclosure to disclose such a method as defined in any of the above, wherein an adjacent connected component to a given connected component, is at least a direct vertical neighbor, a direct horizontal neighbor, a secondary horizontal neighbor, or a secondary vertical neighbor.

It is another object of the present disclosure to disclose such a method as defined in any of the above, wherein all the connected components are extracted from the binarized document and then for each connected component extracted, it is discriminated whether said connected component is a regular component, preferably a text component, more preferably a text character.

It is another object of the present disclosure to disclose such a method as defined in any of the above, wherein at least one connected component which is determined as a text component and has the highest homogeneity value among all text components that are yet to be grown into text lines is selected as a seed for forming an initial text structure, preferably a text line.

It is another object of the present disclosure to disclose such a method as defined in any of the above, wherein during a text line grow iteration, a test determining whether a further connected component is to be added to the text line or not, is performed, the test being based on the comparison of at least one text line parameter representing the level of homogeneity of the text line combined with the further connected component and a given threshold.

It is another object of the present disclosure to disclose such a method as defined in any of the above, wherein a text block is assembled via grow text line iterations with top-down supervision.

It is another object of the present disclosure to disclose such a method as defined in any of the above, wherein a text paragraph is extracted by segmenting a text block based on the analysis of geometric location of the text lines within the text block.

It is another object of the present disclosure to disclose such a method as defined in any of the above, wherein a non-text region is extracted via a seed-grow-extraction process.

It is another object of the present disclosure to disclose such a method as defined in any of the above, wherein the or at least one text line which has yet to be grown into a text block is selected as a seed for forming an intermediate text structure, preferably a column or a row of a table, using at least one parameter of the text line parameter and a given threshold.

It is another object of the present disclosure to disclose such a method as defined in any of the above, wherein during an intermediate text structure grow iteration, a test determining whether a further text line is to be added to the intermediate text structure or not, is performed, said test being based on the comparison of at least one intermediate text structure parameter representing the level of homogeneity of the intermediate text structure combined with the further text line and a given threshold.

It is another object of the present disclosure to disclose such a method as defined in any of the above, wherein (the) at least one intermediate text structure which has yet to be grown into a complex text structure is selected as a seed for forming a complex text structure using (the) at least one parameter of the intermediate text structure and a given threshold, preferably said complex text structure being a table.

It is another object of the present disclosure to disclose such a method as defined in any of the above, wherein during a complex text structure grow iteration, a test determining whether a further intermediate text structure is to be added to the complex text structure or not, is performed, said test being based on the comparison of at least one complex text structure parameter representing the level of homogeneity of the complex text structure combined with the further intermediate text structure and a given threshold, preferably said complex text structure being a table.

It is another object of the present disclosure to disclose such a method as defined in any of the above, wherein the or at least one non-text component which has yet to be grown into a (further) non-text region is selected as a template for forming a(the) complex text structure using at least one image characteristic parameter of the said non-text component, preferably said complex text structure being a table, a form, a chart, or a diagram.

It is another object of the present disclosure to disclose such a method as defined in any of the above, wherein at least one (further) text structure, preferably a text line or text block, which is contained in, or adjacent to, a region comprising (the) at least one template, is selected as a template-filling for forming a(the) complex text structure, preferably said complex text structure being a table, a form, a chart, or a diagram.

It is another object of the present disclosure to disclose such a method as defined in any of the above, wherein during a(the) complex text structure grow iteration, a test determining whether a further template is to be added to the complex text structure or not, is performed, said test being based on the comparison of (the) at least one complex text structure parameter representing the level of homogeneity of the complex text structure combined with the further template and a given threshold, preferably said complex text structure being a table, a form, a chart or a diagram.

It is another object of the present disclosure to disclose such a method as defined in any of the above, wherein during a(the) complex text structure grow iteration, a test determining whether a further template-filling is to be added to the complex text structure or not, is performed, said test being based on the comparison of (the) at least one complex text structure parameter representing the level of homogeneity of the complex text structure combined with the further template-filling and a given threshold, preferably said complex text structure being a table, a form, a chart or a diagram.

In accordance with another object of the present disclosure, there is provided a method for optical character recognition (OCR). In accordance with another object of the present disclosure, there is provided a data processing apparatus. The data processing apparatus can comprise a computing or processing unit programmed to carry out the method as described herein. In accordance with another object of the present disclosure, there is provided a computer program. In accordance with another object of the present disclosure, there is provided a computer-readable medium.

BRIEF DESCRIPTION OF THE DRAWINGS

Aspects of the present disclosure will now be described in more detail with reference to the appended drawings, wherein same reference numerals illustrate same features and wherein.

DESCRIPTION OF EMBODIMENTS

Figure 1:
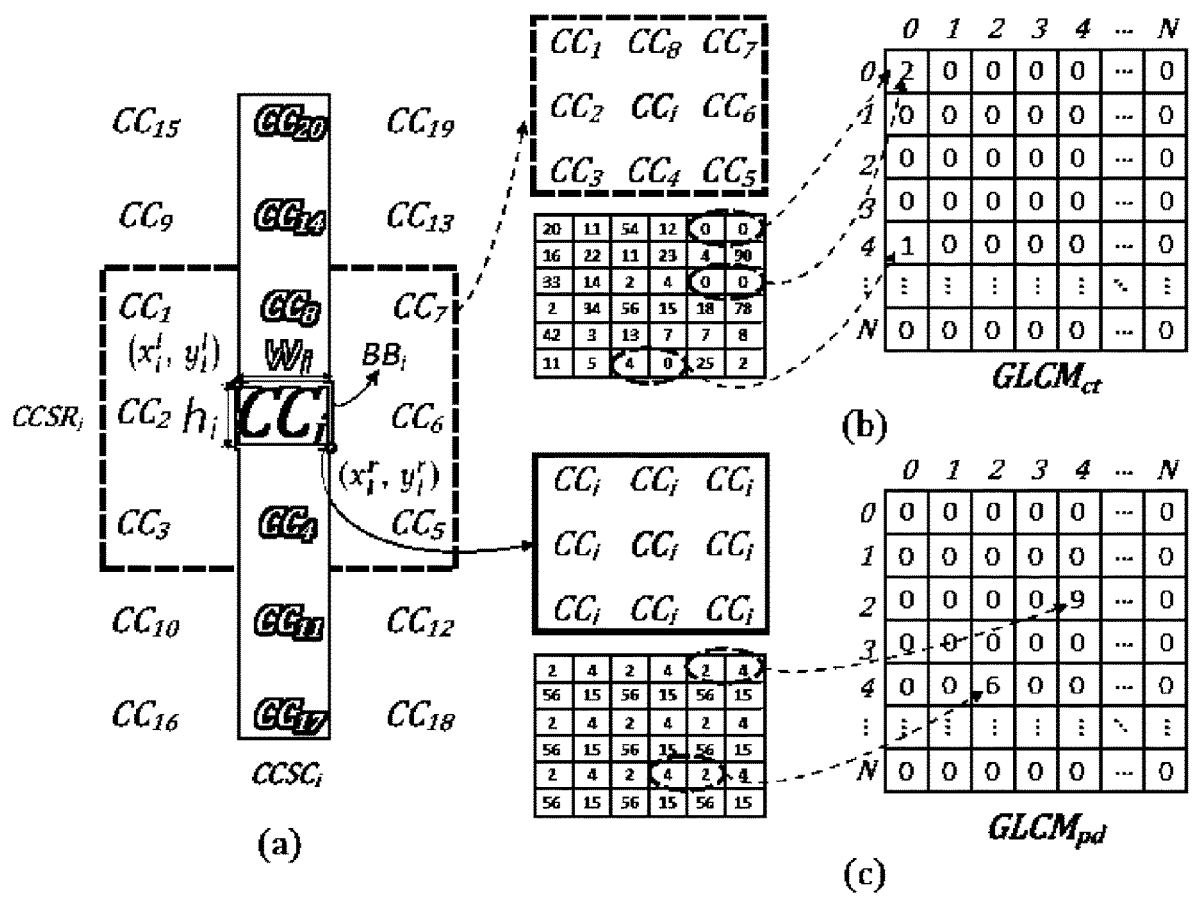
FIG. 1 represents a homogeneous region (preferably a text region) in an image (preferably a document image) based on the analysis of the connected components extracted from the binarized image.

FIG. 1 represents the analysis of a set of connected components (CC) (also denoted as $CC_i$ or $CC_j$, for individual CC, or CCs for a group of connected components depending on the circumstances) extracted from a binarized image. Approaches to extract connected components CC are not described in this disclosure because they are well known to the skilled person. A connected component CC can contain at least a regular (or irregular) component, a text component, a text character, part of a text character, a non-text component, part of a non-text component, and comes with a set of morphological features and a set of texture features.

At least one image characteristic parameter (e.g. morphological feature or texture feature) is used to discriminate whether a given connected component CC is a text character, for instance ASCII code, Unicode or the like. Of course the discrimination of the computer implemented method according to the present disclosure can be generalized to any text component (e.g. a part of a text character) or any component presenting a regular pattern.

At least one morphological feature of a given connected component $CC_i$ can be defined by any of the following features taken in isolation or any (linear or non-linear) combination thereof, or any other features that are derived from:

- a bounding box BB; which is the smallest rectangle containing the region spanned by the given connected component $CC_i$;
- $(x_i, y_i)$ which are the coordinates of the centroids of the bounding box $BB_i$;
- bounding box vector $\overline{bb}_i = (x_i^l, y_i^l, w_i, h_i, x_i^r, y_i^r)$ where $(x_i^l, y_i^l)$ and $(x_i^r, y_i^r)$ are the coordinates of the top left and bottom right corner of the bounding box $BB_i$ respectively, while $w_i$ and $h_i$ represent the width and height of the bounding box $BB_i$;
- aspect ratio $a_i = \min(w_i, h_i)/\max(w_i, h_i)$;
- area $A_i = w_i \cdot h_i$;
- extent $e_i = \sum_{x=x_i^l}^{x_i^r} \sum_{y=y_i^l}^{y_i^r} I_b(x,y)/A_i$, where $I_b(x, y)$ is a binary image;
- Euler number $\beta_i = 1 - n_i$, where $n_i$ is the number of holes contained in the given connected component $CC_i$;
- the set of connected components CCs horizontally neighboring the given connected component $CC_i$:

$SR_i = \{CC_j | \min(y_i^r, y_j^r) - \max(y_i^l, y_j^l) >= 0, j \neq i\};$

- the set of connected components CCs vertically neighboring the given connected component CC:

$SC_i = \{CC_j | \min(x_i^r, x_j^r) - \max(x_i^l, x_j^l) >= 0, j \neq i\};$

- a direction of the given connected component $CC_i$: $dir_i \in \{0,1\}$ represents the direction (horizontal/ vertical) of the text line that contains the given connected component $CC_i$. The direction $dir_i$ is obtained by comparing the distances between the given connected component $CC_i$ and its horizontal and vertical neighbors.

At least one texture feature that can be used for the present disclosure is the grey level co-occurrence matrix GLCM. It defines the joint probability $P_{dx, dy}(i, j)$ of the co-occurrence of a pair of pixels that are related to each other by their intensities (i, j) and spatial relativities (specified by dx and dy). A texture description scheme can be based on two GLCM configurations: context grey level co-occurrence matrix $GLCM_{ct}$ and periodic grey level co-occurrence matrix $GLCM_{pd}$. Owing to text homogeneity, the neighborhoods of two text components share a similar texture pattern. The co-occurrence matrix of $GLCM_{ct}$ of a given connected component $CC_i$ is extracted from a context region that contains not only the given connected component $CC_i$ but also its neighborhood region. On the other hand, the co-occurrence matrix of $GLCM_{pd}$ is extracted from a patch consisting of duplications of the given connected component $CC_i$ itself. These two configurations are shown in FIG. 1.

Under each configuration, co-occurrence matrices $GLCM_\theta$ are extracted along four ($\theta=0$, 45°, 90°, 135°) different directions. By analyzing the joint probabilities $P_\theta(i,j)$ which are obtained by normalizing the co-occurrence matrices, the feature vector $\vec{f}^\theta = [f_{con}^\theta, f_{cor}^\theta, f_{eng}^\theta, f_{hom}^\theta, f_{ent}^\theta]^T$ is extracted, where the components are defined as:

contrast $f_{con}^\theta = \Sigma_i\Sigma_j |i-j|^2 P_\theta(i,j)$;

correlation $f_{cor}^\theta = \Sigma_i\Sigma_j[(i-\mu_i)(j-\mu_j)P_\theta(i,j)/\sigma_i\sigma_j]$, where $\mu_i = \Sigma_i\Sigma_j i P(i,j)$ and $\sigma_i = \sqrt{\Sigma_i\Sigma_j(i-\mu_i)^2 P(i,j)}$;

energy $f_{eng}^\theta = \Sigma_i\Sigma_j P_\theta^2(i,j)$;

homogeneity $f_{hom}^\theta = \Sigma_i\Sigma_j [P_\theta(i,j)/(1+|i-j|)]$;

entropy $f_{ent}^\theta = -\Sigma_i\Sigma_j P_\theta(i,j) \ln P_\theta(i,j)$.

The texture descriptor of a given connected component $CC_i$ is constructed as $\vec{f}^{mod} = \Sigma_\theta \vec{f}^\theta$ where $\theta \in \{0, 45°, 90°, 135°\}$, and $mod \in \{ct, pd\}$.

Figure 2:
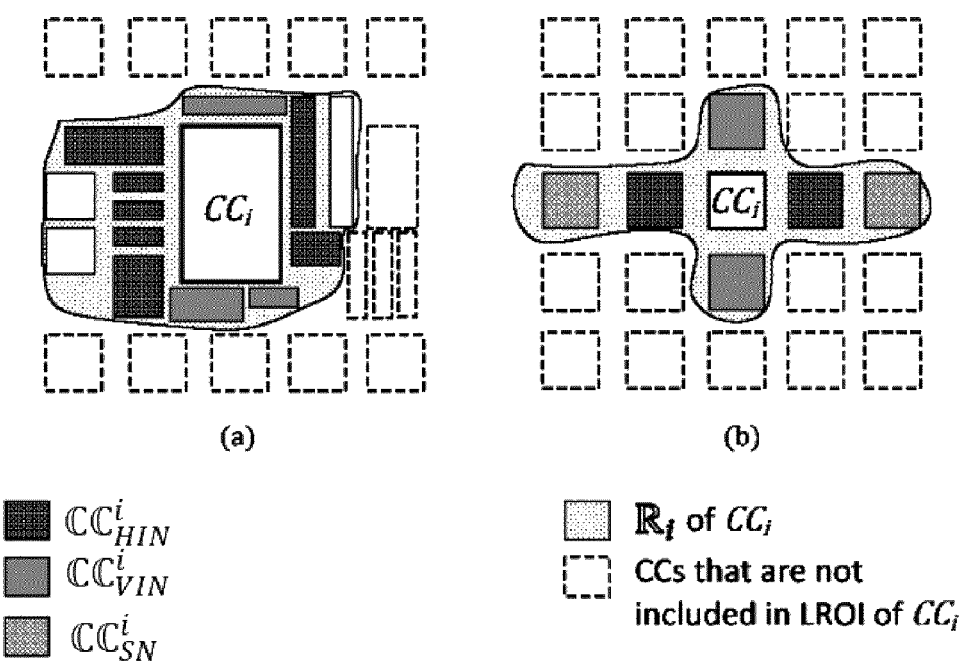
FIG. 2 represents the local region or local region of interest of a specific connected component, both in homogeneous and heterogeneous scenarios.

In FIG. 2, a local region of interest LROI, which is also denoted as local region, is defined for a connected component $CC_i$ under both homogeneous and heterogeneous simulations. The regional layer text homogeneity is exploited by surveying the relationships between $CC_i$ and its neighboring (also denoted as adjacent) connected component CCs within the region. The local region of interest LROI of a given connected component $CC_i$ can consist of three groups of neighboring connected components CCs namely horizontal immediate neighbors $\mathbb{CC}_{HIN}^i$, vertical immediate neighbors $\mathbb{CC}_{VIN}^i$ and secondary neighbors $\mathbb{CC}_{SN}^i$. Therefore, local region of interest LROI can be defined as follow:

$\mathbb{LROI}_i = \{\mathbb{CC}_{HIN}^i, \mathbb{CC}_{VIN}^i, \mathbb{CC}_{SN}^i\}$, where the immediate neighbors of the given connected component $CC_i$ are defined as:

$\mathbb{CC}_{HIN}^i = \{CC_j | CC_j \in \mathbb{SR}_i \wedge (\neg \exists CC_k : CC_k \in \mathbb{SR}_i \wedge (x_j^l < x_k^l < x_i^l \vee x_i^l < x_k^l < x_j^l), k \neq j), j \neq i\}$ $\mathbb{CC}_{VIN}^i = \{CC_j | CC_j \in \mathbb{SR}_i \wedge (\neg \exists CC_k : CC_k \in \mathbb{SR}_i \wedge (y_j^l < y_k^l < y_i^l \vee y_i^l < y_k^l < y_j^l), k \neq j), j \neq i\}$.

To further enhance the statistical description of the regional layer homogeneity, the area of local region of interest LROI is expanded by introducing the secondary neighbors:

$$\mathbb{CC}_{SN}^i = \begin{cases} \{CC_j | CC_j \in \mathbb{SR}_i^{r_sNN} \wedge CC_j \notin \mathbb{CC}_{HIN}^i\}; \text{ if } dir_i = 0; \\ \{CC_j | CC_j \in \mathbb{SC}_i^{r_sNN} \wedge CC_j \notin \mathbb{CC}_{VIN}^i\}; \text{ if } dir_i = 1. \end{cases}$$

where $\mathbb{SR}_i^{r_sNN}$ and $\mathbb{SR}_i^{r_sNN}$ represent the $r_s$ nearest horizontal and vertical neighbors of a given connected component $CC_i$ respectively. The physical region spanned by the neighboring connected components CCs included in $\mathbb{LROI}_i$ is presented as $\mathbb{R}_i$:

$\mathbb{R}_i = \{HIN_i, VIN_i, SN_i\}$;

where $HIN_i$, $VIN_i$ and $SN_i$ denote the subregions spanned by the given connected component $CC_i$ together with the neighboring connected components CCs included in $\mathbb{CC}_{HIN}^i$, $\mathbb{CC}_{VIN}^i$, and $\mathbb{CC}_{SN}^i$ respectively. A demonstration of configurations of a local region LROI of a given connected component $CC_i$ in homogeneous and heterogeneous scenarios are depicted in FIG. 2. The definition of a local region LROI spanned by a set of neighboring connected components CCs refers to the physical region that contains and only contains the bounding boxes of all the neighboring connected components CCs included in the set.

This configuration of a local regional of interest (LROI) of a connected component can of course be generalized to describe any region containing a connected component and its neighboring components that could be related to the component in any forms (e.g. distances, orientations, etc.).

Figure 3:
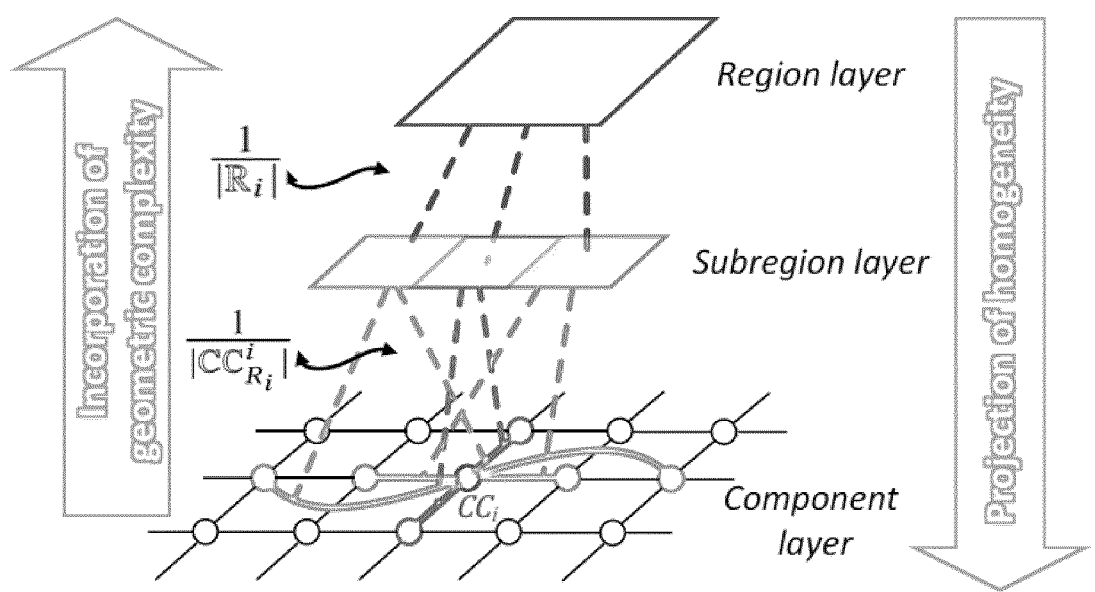
FIG. 3 represents the hierarchical projection of homogeneity from a region layer to component layer.

FIG. 3 shows how homogeneity is defined at regional layer and exploited at component layer. To exploit text homogeneity in the local region LROI of a connected component $CC_i$, the regional layer homogeneity is projected to the connected component layer where the homogeneity between the connected component $CC_i$ and a further connected component $CC_j$ is described using a binary random variable $s_{ij}$:

$$s_{ij} = \begin{cases} s_{ij}^+, \text{ if connected components } CC_i \text{ and } CC_j \text{ are homogeneous}; \\ s_{ij}^-, \text{ if connected components } CC_i \text{ and } CC_j \text{ are heterogeneous}; \end{cases}$$

The regional layer homogeneity variable $t_{iR_i}$ is introduced:

$t_{iR_l} = P(s_{ij} = s_{ij}^+) = p_{ij}, CC_j \in \mathbb{CC}_{R_i}^i$;

where $R_i \in \mathbb{R}_i$ and $P(s_{ij} = s_{ij}^+)$ denotes the probability that the connected component $CC_i$ and the further connected component $CC_j$ are homogeneous at the component layer. The regional layer homogeneity variable $t_{iR_i}$ is associated with a uniform distribution:

$$P(t_{iR_i} = p_{ij}) = \frac{1}{|\mathbb{CC}_{R_i}^i|}, \qquad \text{[Equation 1]}$$

where $|\mathbb{CC}_{R_i}^i|$ denotes the cardinality of set $\mathbb{CC}_{R_i}^i$.

The introduction of the regional layer homogeneity variable $t_{iR_i}$ helps to characterize the homogeneity of a subregion $R_i$ spanned by the connected component $CC_i$ and a set of its neighboring connected components CCs, and the stipulated uniform distribution inversely proportional to the region dimension in Equation 1 enables to incorporate the neighborhood geometric complexity when projecting homogeneity from regional layer to component layer. As it can be observed from FIG. 2, a complicated neighborhood results in an increased number of neighboring connected components CCs included in the local region LROI of connected component $CC_i$, which subsequently renders a reduced $P(t_{iR_i} = p_{ij})$. As such, the likelihood that homogeneity is preserved at regional level is lower from a component with complicated neighborhood comparing to a component with a more regular neighborhood.

The local text homogeneity variable $r_i$ can be expressed as the result of a combination of the expectation of the regional homogeneity of different subregions $$r_i = E(t_{iR_k}) = e_{iR_k}, R_k \in \mathbb{R}_i;$$

where $E(t_{iR_k})$ denotes the expectation of the regional homogeneity variable $t_{iR_k}$. As it is assumed that the local homogeneity of a connected component $CC_i$ is affected equally by the homogeneity from each subregions of $\mathbb{R}_i$, the local text homogeneity variable $r_i$ is associated to a uniform distribution:

$$P(r_i = e_{iR_k}) = 1/|\mathbb{R}_i|;$$

and the probabilistic local text homogeneity PLTH of the connected component $CC_i$ is defined as the expectation of $r_i$:

$$PLTH_i = E(r_i).$$

Given the local region configuration presented in this present disclosure, the probabilistic local text homogeneity PLTH can be the following:

$$PLTH_i = \quad\text{[Equation 2]}$$
$$E(r_i) = \sum_k e_{iR_k} P(r_i = e_{iR_k}) = \sum_k E(t_{iR_k}) P(r_i = e_{iR_k}) =$$
$$\frac{1}{|\mathbb{R}_i|}[E(t_{iHIN_i}) + E(t_{iVIN_i}) + E(t_{iSN_i})] =$$
$$\frac{1}{3|CC^i_{HIN}|}\sum_l P(s_{il} = s^+_{il}) +$$
$$\frac{1}{3|CC^i_{VIN}|}\sum_m P(s_{im} = s^+_{im}) +$$
$$\frac{1}{3|CC^i_{SN}|}\sum_n P(s_{in} = s^+_{in});$$

where $\mathbb{R}_i = \{HIN_i, VIN_i, SN_i\}$, $CC_l \in CC_{HIN}^i$, $CC_m \in CC_{VIN}^i$ and $CC_n \in CC_{SN}^i$.

As shown in FIG. 3, an hierarchical structure can be observed from Equation 2 where regional layer local text homogeneity $r_i$ is advantageously projected progressively onto first sub-regional layer (characterized by $t_{iHIN_i}$, $t_{iVIN_i}$, and $t_{iSN_i}$) and then component layer where the probabilistic homogeneity is characterized by $P(s_{ij} = s_{ij}^+)$ between two connected components $CC_i$ and $CC_j$.

This model formulated to describe homogeneity can of course be generalized to any models that characterize, based on the exploitation of relations between connected components that are relatable to each other, any pattern in a region consisting of proximately and regularly (e.g. symmetrically) arranged components with similarities.

The evaluation of component layer homogeneity advantageously uses a probabilistic cue integration approach. Given the observations $\vec{H}_i$ and $\vec{H}_j$ of two connected components $CC_i$ and $CC_j$, the probabilistic component layer homogeneity $P(s_{ij}^+|\vec{H}_i, \vec{H}_j)$ is advantageously evaluated using a 'mixture-of-experts' model:

$$P(s_{ij}^+|\vec{H}_i, \vec{H}_j) = \sum_k P(s_{ij}^+, c_k|\vec{H}_i, \vec{H}_j) \quad\text{[Equation 3]}$$
$$= \sum_k P(s_{ij}^+|\vec{H}_i, \vec{H}_j, c_k) P(c_k|\vec{H}_i, \vec{H}_j),$$

where $P(s_{ij}^+|\vec{H}_i, \vec{H}_j, c_k)$ measures the probabilistic homogeneity $P(s_{ij}^+|\vec{H}_i, \vec{H}_j)$ under cue $c_k$, and $P(c_k|\vec{H}_i, \vec{H}_j)$ characterizes the cue priority.

This component layer homogeneity model can of course be generalized to any models that evaluate the similarity/dissimilarity of two components by first evaluating the similarities/dissimilarities of two components from multiple aspects using one or more morphological or texture or any other features, and then integrating these respective measurements into the overall similarity/dissimilarity.

The cue integration structure of Equation 3 offers a comprehensive yet particular way to evaluate the component layer probabilistic homogeneity. The comprehensiveness is offered by the cue integration process, which enables a joint analysis of various types of features when evaluating the homogeneity between two components, while the particularity is offered by $P(s_{ij}^+|\vec{H}_i, \vec{H}_j, c_k)$ which can engage one or more different features tailored to specific cues. Flexibility of the model is further controlled during the integration process through the cue priority $P(c_k|\vec{H}_i, \vec{H}_j)$.

A joint morphological and texture analysis for the evaluation of component layer homogeneity can be based on Equation 3. Three (one morphological and two texture) different cues can be considered, where the feature vector $\vec{f}^{mor} = [h_i, a_i, A_i, e_i]^T$ serves as the observation vector under the morphological cue and the GLCM feature vectors $\vec{f}^{ct}$ and $\vec{f}^{pd}$ are engaged under the two texture cues respectively. It is alternatively possible to use more or less different cues, e.g. two (one morphological and one texture), or just one (morphological or texture).

Under each cue, the probabilistic homogeneity is calculated by following the Bayesian rule:

$$P(s_{ij}^+|\vec{H}_i, \vec{H}_j, c_k) = \frac{\lambda_{ij}^+ P(s_{ij}^+|c_k)}{\lambda_{ij}^+ P(s_{ij}^+|c_k) + \lambda_{ij}^- P(s_{ij}^-|c_k)}, \quad\text{[Equation 4]}$$

where $\lambda_{ij}^\pm = p(\vec{H}_i, \vec{H}_j|s_{ij}^\pm, c_k)$ represents the likelihood of obtaining the observations $\vec{H}_i$ and $\vec{H}_j$ given the homogeneity status $s_{ij}^\pm$ between components $CC_i$ and $CC_j$, and $P(s_{ij}^+|c_k)$ is the cue-specific homogeneity prior. In the present implementation, cue independent priors are considered:

$$P(s_{ij}^\pm|c_k) = P(s_{ij}^\pm),$$

and Equation 4 is simplified as:

$$P(s_{ij}^+|\vec{H}_i, \vec{H}_j, c_k) = \frac{\lambda_{ij}^+ P(s_{ij}^+)}{\lambda_{ij}^+ P(s_{ij}^+) + \lambda_{ij}^- P(s_{ij}^-)}. \quad\text{[Equation 5]}$$

Embodiments of this disclosure itself however clearly follow a general formulation where the cue-specific prior $P(s_{ij}^{\pm}|c_k)$ can be formulated using any cue-dependent or cue-independent information in respective implementations.

Given the observed feature vectors $\vec{H}_i^k \subset \vec{H}_i$, $\vec{H}_j^k \subset \vec{H}_j$ of components $CC_i$ and $CC_j$ under cue $c_k$, the likelihood can be modelled using the multivariate Gaussian (MVG) densities:

$$\lambda_{ij}^{\pm} = p(\vec{H}_i^k, \vec{H}_j^k | s_{ij}^{\pm}, c_k) = p(g^{\pm}(\Delta \vec{H}^k) | s_{ij}^{\pm}, c_k) \qquad \text{[Equation 6]}$$
$$= \mathcal{N}(\vec{H}_{ij}^k | \vec{\mu}^{\pm}, \Sigma^{\pm})$$
$$= \mathcal{N}(\vec{H}_{ij}^k | \vec{\mu}^{\pm}, \text{diag}(\sigma_1^{\pm}, \ldots, \sigma_M^{\pm})),$$

where $\Delta \vec{H}^k = \vec{H}_i^k - \vec{H}_j^k$ measures the discrepancy between the features of connected components $CC_i$ and $CC_j$, and $g^{\pm}$ is a transformation function ($\mathbb{R}^{m \times 1} \to \mathbb{R}^{m \times 1}$). $\mathcal{N}(\vec{\mu}^{\pm}, \Sigma^{\pm})$ is the MVG density with mean vector $\vec{\mu}^{\pm}$ and covariance matrix $\Sigma^{\pm}$. Assuming that different features under the same cue are independent from each other, $\Sigma^{\pm}$ reduces to a diagonal matrix $\text{diag}(\sigma_1^{\pm}, \ldots \sigma_M^{\pm})$ where $\sigma_m^{\pm}$ ($m=1, 2, \ldots, M$) control the dimensional variance of the MVG distribution. Take note that M represents the dimension of the feature vector $\vec{H}_i^k$ under cue $c_k$. To keep a compact notation and without introducing ambiguity, the cue indicator k is dropped and the cue specific feature vector $\vec{H}_i^k$ as $\vec{H}_i$ is denoted in the following discussions.

Embodiments of this disclosure itself however clearly follow a general formulation where the likelihood densities $\lambda_{ij}^{\pm}$ can be modelled using any single-variate (in case of using single-element feature vectors $\vec{H}_i^k$ and $\vec{H}_j^k$) density models such as Laplacian distribution, or multivariate (in case of using multi-elements feature vectors $\vec{H}_i^k$ and $\vec{H}_j^k$) density models such as multivariate generalized Gaussian distribution or matrix gamma distribution.

Given that similarity between components is a major characteristic of the text homogeneity, a higher positive likelihood density $p(\vec{H}_i, \vec{H}_j | s_{ij}^{+}, c_k)$ suggests a smaller disparity between the observations $\vec{H}_i$ and $\vec{H}_j$ of the two components. The positive likelihood density can be modeled as a zero mean MVG distribution $$p(\vec{H}_i, \vec{H}_j | s_{ij}^{+}, c_k) = \mathcal{N}(\vec{H}_{ij}^{+} | \vec{0}, \text{diag}(\sigma_1^{+}, \ldots \sigma_M^{+})) \qquad \text{[Equation 7]}$$

of the discrepancy vector $\vec{H}_{ij}^{+}$ which is obtained using a linear transformation L:

$$L = \text{diag}(\min(|h_i^1|,|h_j^1|), \ldots, \min(|h_i^M|,|h_j^M|)), \qquad \text{[Equation 8]}$$

such that:

$$\vec{H}_{ij}^{+} = g^{+}(\Delta \vec{H}) = L^{-1} \Delta \vec{H}, \qquad \text{[Equation 9]}$$
$$= \left[ \frac{\Delta h_{ij}^1}{\min(|h_i^1|,|h_j^1|)}, \ldots, \frac{\Delta h_{ij}^M}{\min(|h_i^M|,|h_j^M|)} \right]^T,$$

where $h_i^m$, $h_j^m$, $m=1, \ldots, M$ are the $m^{th}$ components of $\vec{H}_i$ and $\vec{H}_j$ respectively, and $\Delta h_{ij}^m = h_i^m - h_j^m$.

The vector $\vec{\sigma}^{+} = [\sigma_1^{+}, \ldots, \sigma_M^{+}]^T$ controls the sharpness of the MVG distribution in M-dimensional space. Small values in $\vec{\sigma}^{+}$ render a compact distribution where the density is concentrated around the origin 0 such that likelihood increases when $\vec{H}_{ij}^{+} \to 0$, and decreases drastically when the measured differences between the two components deviates from 0. On the other hand, higher values in $\vec{\sigma}^{+}$ give a flattened distribution where the decrease in likelihood is less drastic when the measured differences between two components is increasing, however the homogeneity likelihood is also smaller comparing to that of a model with smaller $\vec{\sigma}^{+}$ when the measured differences approach zero.

A set of neighboring connected component CCs is incorporated in the vicinity of given components $CC_i$ and $CC_j$ when estimating $\vec{\sigma}^{+}$:

$$\vec{\sigma}^{+} = \tfrac{1}{2}(\vec{\sigma}_i^{+} + \vec{\sigma}_j^{+}). \qquad \text{[Equation 10]}$$

To determine $\vec{\sigma}_i^{+}$ (and likewise for $\vec{\sigma}_j^{+}$), $\mathbb{CC}_{rNN}^i$ is first identified. $\mathbb{CC}_{rNN}^i$ contains r nearest neighboring connected component CCs of the given component $CC_i$. Then, the discrepancy vector $\vec{H}_{is_n}^{+}$ between $CC_i$ and $CC_{s_n} \in \mathbb{CC}_{rNN}^i$ is computed by following a similar process to that expose in Equation 9:

$$\vec{H}_{is_n}^{+} = L^{-1} |\vec{H}_i - \vec{H}_{s_n}|, \qquad \text{[Equation 11]}$$
$$= \left[ \frac{|\Delta h_{is_n}^1|}{\min(|h_i^1|,|h_{s_n}^1|)}, \ldots, \frac{|\Delta h_{is_n}^M|}{\min(|h_i^M|,|h_{s_n}^M|)} \right]^T,$$

where $\vec{H}_{s_n}$ is the cue specific feature vector of component $CC_{s_n}$.

$\vec{\sigma}_i^{+}$ is determined by analyzing the element-wise variance of the discrepancy vectors $\vec{H}_{is_n}^{+}$ between $CC_i$ and its r nearest neighbors:

$$\vec{\sigma}_i^{+} = \Sigma_{n=1}^r (\vec{d}_{is_n} (\vec{H}_{is_n}^{+})^2) - (\Sigma_{n=1}^r \vec{d}_{is_n} \vec{H}_{is_n}^{+})^2, \qquad \text{[Equation 12]}$$

where $(\vec{H}_{is_n}^{+})^2$ represents the element-wise square on vector $\vec{H}_{is_n}^{+}$, and $\vec{d}_{is_n}$ is the normalized inversed distance between connected components $CC_i$ and $CC_{s_n}$:

$$\vec{d}_{is_n} = \frac{1}{d_{is_n}} \bigg/ \Sigma_{n=1}^r \frac{1}{d_{is_n}}. \qquad \text{[Equation 13]}$$

As suggested by Equation 12, homogeneous neighborhoods of connected component $CC_i$ (and $CC_j$) will lead to small valued model parameters $\vec{\sigma}^{+}$ such that the homogeneity likelihood between components $CC_i$ and $CC_j$ is sensitively tuned to the measured differences $\vec{H}_{ij}^{+}$. On the other hand, heterogeneous neighborhoods of connected components $CC_i$ (and $CC_j$) will lead to a flattened likelihood distribution where the homogeneity likelihood of the two components is expected to be low even if the two share some similarities.

In contrast to the positive likelihood, a higher negative likelihood density $p(\vec{H}_i, \vec{H}_j | s_{ij}^{-}, c_k)$ suggests a larger discrepancy between the observations of the two components. The negative likelihood density can be modeled as a zero mean MVG distribution:

$$p(\vec{H}_i, \vec{H}_j | s_{ij}^-, c_k) = \mathcal{N}(\vec{H}_{ij}^- | \vec{0}, \text{diag}(\sigma_1^-, \ldots \sigma_M^-)), \quad \text{[Equation 14]}$$

where the discrepancy vector $\vec{H}_{ij}^-$ is obtained using a element-wise nonlinear transformation function:

$$g^-(x) = \text{sgn}(x) \frac{\alpha e^{-|x|/3}}{|x|^3 + \beta}, \; \text{sgn}(x) = \begin{pmatrix} 1, & x \geq 0; \\ -1, & x < 0. \end{pmatrix} \quad \text{[Equation 15]}$$

such that:

$$\vec{H}_{ij}^- = g^-(\vec{H}_{ij}^+) \quad \text{[Equation 16]}$$

$$= \left[ \text{sgn}(h_1^+) \frac{\gamma_1 e^{-|h_1^+|/3}}{|h_1^+|^3 + \gamma_2}, \ldots, \text{sgn}(h_M^+) \frac{\gamma_1 e^{-|h_M^+|/3}}{|h_M^+|^3 + \gamma_2} \right],$$

where $h_M^+$ is the $m^{th}$ component of $\vec{H}_{ij}^+$. $\gamma_1$ and $\gamma_2$ are set to 2.8 and 1 in the present embodiment.

To determine $\vec{\sigma}^- = [\sigma_1^-, \ldots, \sigma_M^-]^T$, the element-wise average of the discrepancy vectors over the local regions LROI of components $\mathcal{CC}_i$ and $\mathcal{CC}_j$ is measured:

$$\vec{\sigma}_i^- = \Sigma_{n=1}^r (\vec{d}_{is_n}(\vec{H}_{is_n}^-)^2), \quad \text{[Equation 17]}$$

$$\vec{\sigma}_j^- = \Sigma_{n=1}^r (\vec{d}_{jt_n}(\vec{H}_{jt_n}^-)^2), \quad \text{[Equation 18]}$$

where $\vec{H}_{is_n}^- = g^-(\vec{H}_{is_n}^+)$ and $\vec{H}_{jt_n}^- = g^-(\vec{H}_{jt_n}^+)$, and $\vec{\sigma}^-$ is estimated as:

$$\vec{\sigma}^- = \frac{1}{2}(\vec{\sigma}_i^- + \vec{\sigma}_j^-). \quad \text{[Equation 19]}$$

Embodiments of this disclosure itself however clearly follow a general formulation where the likelihood densities $\lambda_{ij}^\pm$ can be modelled using any distributions where appropriate. The estimation of the parameters of the respective likelihood densities can be implemented in different manners which may or may not exploit features of sets of connected components which could be related to the connected components $\mathcal{CC}_i$ and $\mathcal{CC}_j$.

The proximity and regularity (e.g. symmetry) attributes of text homogeneity can be modelled when formulating the prior:

$$P(s_{ij}^+) = P_{ij}^d \cdot p_{ij}^a, \quad \text{[Equation 20]}$$

where $P_{ij}^d$ and $P_{ij}^a$ represent the characterization of the text homogeneity prior using the distance between and the alignment of the two connected components $\mathcal{CC}_i$ and $\mathcal{CC}_j$ respectively.

Considering the distance cue, two letters or words are expected to be placed neither too close nor too far from each other. The normalized distance $d_{ij}'$ between two components can be mapped to the distance prior $P_{ij}^d$ by using a bi-model Gaussian kernel:

$$P_{ij}^d = \frac{1}{c} e^{-\frac{(d_{ij}' - \mu_1)^2}{2\sigma_d^2}} + \frac{1}{c} e^{-\frac{(d_{ij}' - \mu_2)^2}{2\sigma_d^2}}, \quad \text{[Equation 21]}$$

where c is a normalization factor and $d_{ij}'$ denotes the dimensional distance normalized with respect to the size of $\mathcal{CC}_i$:

$$d_{ij}' = \begin{cases} (x_i - x_j)/\sqrt{A_i}, & \text{if } \mathcal{CC}_j \in \mathcal{CC}_{HIN}^i; \\ (y_i - y_j)/\sqrt{A_i}, & \text{if } \mathcal{CC}_j \in \mathcal{CC}_{VIN}^i. \end{cases} \quad \text{[Equation 22]}$$

On the other hand, the alignment between components $CC_i$ and $CC_j$ can be measured as:

$$ali_{ij} = \begin{cases} (y_i - y_j)/h_i, & \text{if } \mathcal{CC}_j \in \mathcal{CC}_{HIN}^i; \\ (x_i - x_j)/w_i, & \text{if } \mathcal{CC}_j \in \mathcal{CC}_{VIN}^i; \end{cases}$$

and $P_{ij}^a$ can be determined as:

$$P_{ij}^a = e^{-\frac{ali_{ij}^2}{2\sigma_a^2}} \quad \text{[Equation 23]}$$

In the present embodiment, the parameters can be set according to Table 1 shown below.

TABLE 1

| | Prior model parameter | |
|---|---|---|
| | Text Line Direction | |
| Spatial Relations | Horizontal (dir$_i$ = 0) | Vertical (dir$_i$ = 1) |
| $\mathcal{CC}_j \in \mathcal{CC}_{HIN}^i$ | $\mu_1 = -1, \mu_2 = 1,$ $\sigma_d = 0.51, \sigma_a = 0.51$ | $\mu_1 = -2.2, \mu_2 = 2.2,$ $\sigma_d = 0.51, \sigma_a = \text{N.A.}$ |
| $\mathcal{CC}_j \in \mathcal{CC}_{VIN}^i$ | $\mu_1 = -2.5, \mu_2 = 2.5,$ $\sigma_d = 0.51, \sigma_a = \text{N.A.}$ | $\mu_1 = -1, \mu_2 = 1,$ $\sigma_d = 0.51, \sigma_a = 0.51$ |

When evaluating the local text homogeneity of a given connected component $\mathcal{CC}_i$, the alignment prior can be neglected (denoted as N.A. in Table 1) if a further connected component $\mathcal{CC}_j$ is neighboring the given connected component $\mathcal{CC}_i$ in the direction perpendicular to the text line direction of $\mathcal{CC}_i$.

Embodiments of this disclosure itself however clearly follow a general formulation where the Prior could be implemented in either cue-dependent ($P(s_{ij}^\pm | c_k)$) or cue-independent ($P(s_{ij}^\pm)$) manner. Different models with different features of $\mathcal{CC}_i$ and $\mathcal{CC}_j$, can be used when formulating the prior. In case of the particular formulation provided in Equation 20 to Equation 23, model parameters provided in Table 1 can be adjusted to adapt to various circumstances.

The morphological cue during integration as shown in Table 2 below can be given priority.

TABLE 2

| | | Cue Integration | |
|---|---|---|---|
| | Feature | $P(c_k | \vec{H}_i, \vec{H}_j)$ | |
| Cue | Vector | Normality | Abnormality |
| $c_1$ | $\vec{f}^{mor}$ | 0.5 | 0.6 |
| $c_2$ | $\vec{f}^{ct}$ | 0.2 | 0.1 |
| $c_3$ | $\vec{f}^{pd}$ | 0.3 | 0.3 |

The values presented in Table 2 can be adapted depending on the circumstances. Preferably, two different cue integration schemes are used based on the assertion of morphological normality, which is measured by comparing the sizes of the two connected components. The normality scheme can be used when no one of the two neighboring connected components CCs is more than two times larger (in terms of their bounding box areas) than the other one.

The probabilistic local text homogeneity PLTH values of the non-text components of a document image are generally lower than that of the text components, therefore a text and non-text classification scheme can be obtained by thresholding the probabilistic local text homogeneity PLTH map of a document image.

The segmentation of a document can be done advantageously in the following way:

Based on the probabilistic local text homogeneity PLTH map of a document image, text and non-text components are classified by applying a threshold:

$$\mathbb{CC}^T = \{\mathcal{CC}_i | PLTH_i > \beta\},$$

$$\mathbb{CC}^{NT} = \{\mathcal{CC}_i | PLTH_i \leq \beta\}.$$

Text layouts and non-text structures are subsequently extracted from $\mathbb{CC}^T$ and $\mathbb{CC}^{NT}$ respectively.

Figure 4:
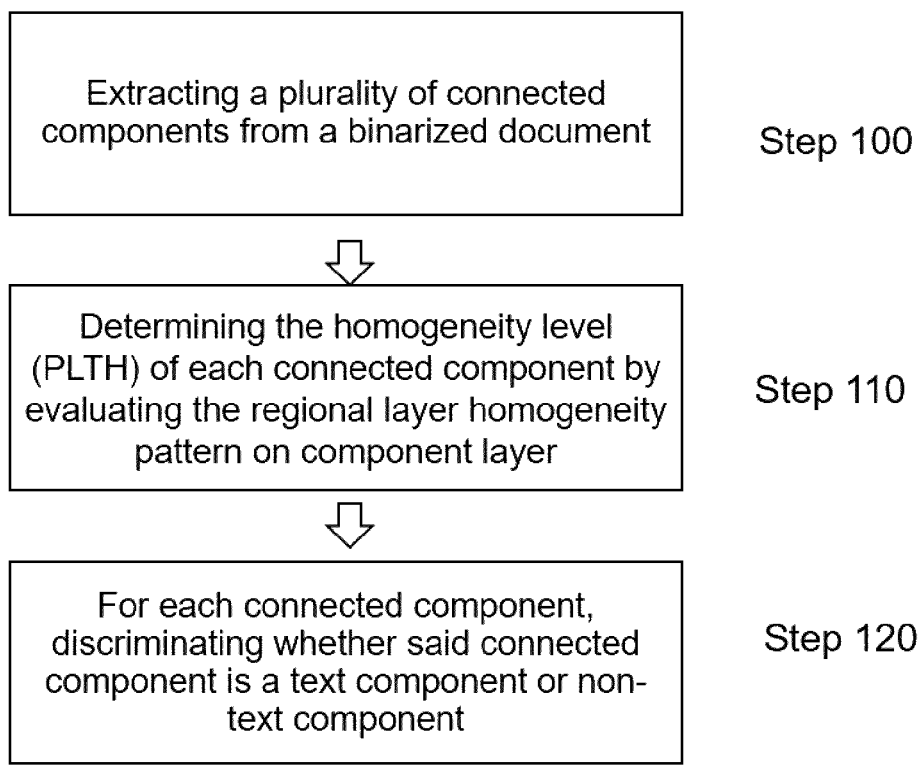
FIG. 4 represents a flowchart with the text and non-text discrimination of the connected components.

FIG. 4 represents a flowchart describing one way to carry out the aspects of present disclosure, where all the connected components CC are extracted from the binarized document in Step 100. Then, for each connected component CC extracted, it is discriminated whether the connected component is a regular component in Step 120 based on the determination of the probabilistic local text homogeneity PLTH in Step 110.

Figure 5:
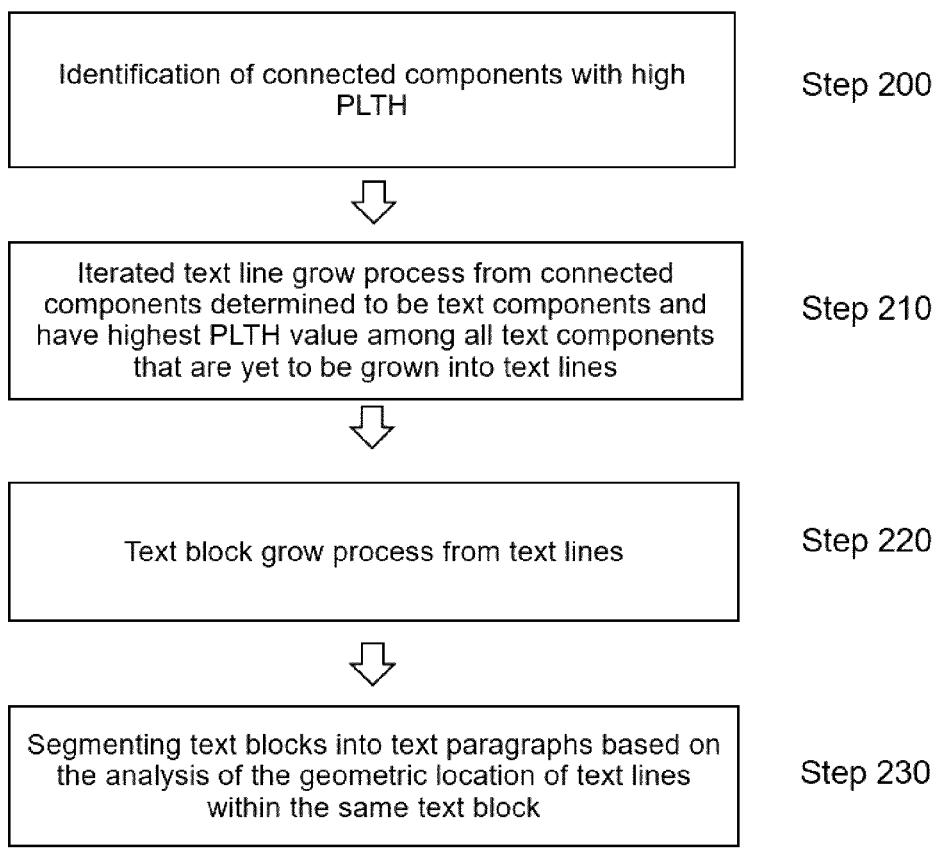
FIG. 5 represents a flowchart with a text block grow process.

FIG. 5 represents a flowchart describing a further embodiment of the present disclosure, where the text block grow process is described. The connected components CC with the highest homogeneity value are selected as seeds for forming initial text components in Step 200. Step 210 relates to the text line grow iterations, wherein a further connected component candidate is added to a text line if a text line parameter representing the level of homogeneity of the text line combined with the further connected component is asserted. Finally, a text block is assembled via grow text line iterations with top-down supervision in Step 220. The segmented document obtained by this process can be subsequently used for an optical character recognition (OCR) process. A properly segmented document allows a better OCR process in terms of quality and processing speed.

Step 230 relates to the text paragraph extraction process, where detailed paragraph information is retrieved based on the within-block analysis of the geometric locations of the text lines contained in the same text block.

Text components with higher probabilistic local text homogeneity PLTH values are identified as text line seeds and are given priorities to be grown into text lines (Step 200). The text homogeneity is defined on the text line layer by introducing a binary random variable $l_{ij}$:

$$l_{ij} = \begin{pmatrix} l_{ij}^+, \\ l_{ij}^-; \end{pmatrix}$$ [Equation 24]

where $P(l_{ij}=l_{ij}^+)$ represents the possibility that text homogeneity is upheld within text line $\mathbb{CC}_i^{TL}$ after the inclusion of a new component $\mathcal{CC}_j \in \mathbb{CC}^T$ ($\mathbb{CC}_i^{TL}$ is used to denote the set of components contained in the text line grown from seed $\mathcal{CC}_i \in \mathbb{CC}^T$), and is computed as:

$$P(l_{ij} = l_{ij}^+) = \begin{pmatrix} 1, & \text{assertion of } hom_{TL}; \\ 0, & \text{otherwise;} \end{pmatrix}$$

where $hom_{TL}$ is defined as (for horizontal text line):

$$hom_{TL} = \frac{\min(h_i, h_j)}{\max(h_i, h_j)} > C_{TL_1} \wedge \frac{\min(w_i, w_j)}{\max(w_i, w_j)} >$$ [Equation 25]

$$C_{TL_2} \wedge \frac{\min(y_i^r, y_j^r) - \max(y_i^l, y_j^l)}{\min(h_i, h_j)} >=$$

$$C_{TL_3} \wedge ws_j < C_{TL_4} \cdot \sqrt{A_i}.$$

$ws_j$ is used to denote the whitespace between the text line candidate $\mathcal{CC}_j$ and the relatable boundary of the current text line grown from $\mathcal{CC}_i$. Four parameters are used to characterize text line homogeneity in terms of height (by $C_{TL_1}$) and width (by $C_{TL_2}$) similarity, text line regularity (e.g. symmetry) (by $C_{TL_3}$) and proximity (by $C_{TL_4}$).

Equation 25 in general promotes a bottom-up analysis of the candidate components. To prevent the false extension of a text line across different text blocks, a top-down supervision is incorporated on the text line growing process. Given an alerting whitespace $ws_j$ measured between text line candidate $\mathcal{CC}_j$ and current text line boundary, the projection profile of a local region stretched across multiple text lines around text line candidate $\mathcal{CC}_j$ is inspected. The presence of zero runs in the projection profile triggers the termination of the text line extension. A refinement process is also foreseen after the initial text line extraction to remove negative text lines consisting of fragmentary noise from a neighboring connected component CCs, and to recover irregular characters (e.g. dots) removed during the probabilistic local text homogeneity PLTH filtering.

Text blocks are extracted based on the exploitation of text homogeneity on text block layer using an approach similar to the method proposed in K. Chen, F. Yin and C.-L. Liu, "Hybrid Page Segmentation with Efficient Whitespace Rectangles Extraction and Grouping," in Proc. 12th Int. Conf. Doc. Anal. Recog., 2013, pp. 958-962. This known approach is enhanced by incorporating a similar projection profile analysis based top-down supervision to prevent the merging of horizontally neighboring (especially nested) text blocks. Upon the extraction and refinement of the text blocks, paragraphs are identified through a within text block segmentation based on the analysis of relative locations of the text lines within the block.

A seed-grow-extraction (SGE) solution to extract different types of structures from image $I^{NT}$ which contains only non-text connected components $\mathcal{CC}_i \in \mathbb{CC}^{NT}$. When extracting a certain type of structure (e.g separators), seeding is advantageously the initial step taken to process image $I^{NT}$ such that regions of the target structures are located while that of the non-target structures are erased to produce an target image $I_{tar}^{NT}$ which contains only eroded target structures. Then, the second step to grow target regions by dilating and merging the components area of the target image $I_{tar}^{NT}$, takes place. The final structures are extracted from the grown target image $I_{tar}^{NT}$.

The proposed SGE process is implemented using mathematical morphology and separators are first extracted. Specifically for vertical (and likewise horizontal) separator extraction, non-text image is first filtered with a horizontal line structuring element $se_{HL}$:

$$I'=I^{nt}\wedge(\neg((I^{nt}\circ se_{HL})\oplus se_{SQ})),$$

where $I^{nt}$ denotes a copy of the image $I^{NT}$ and $se_{SQ}$ is a square element with short sides. Line seeds are then located by opening the filtered image I' using a vertical line structuring element $se_{VL}$:

$$I_{VL}^{nt}=(I'\circ se_{VL})\cdot se_{SQ}.$$

The length of structuring element $se_{VL}$ and $se_{HL}$ is set to the average text line height computed from the height of the bounding boxes of all text lines extracted from the image. After the seeding process, the lines are grown by first extending the bounding boxes of the line seeds in both horizontal and vertical directions and then merging all line seeds in the same box that are horizontally aligned with each other. The margin of the extension is proportional to the width and height of the bounding boxes of the line seeds.

After the extraction of separators, remaining non-text components are heuristically classified into images, graphics, charts and 'reverse-video' text. Similar processes that all follow the SGE paradigm are performed to extract those regions.

In particular cases, the local region of interest LROI can comprise only one connected component $CC_i$ where this connected component $CC_i$ does not have any adjacent (in horizontal or vertical directions) neighbour(s). In this case, the local region of interest LROI can be defined as an empty local region of interest LROI. Similarly, a non-empty LROI can be defined as a local region of interest LROI of a given connected component $CC_i$, comprising the given connected component $CC_i$ and at least one connected component CCs (e.g. neighbour(s) in horizontal or vertical directions) adjacent to the given connected component $CC_i$. If a connected component $CC_i$ does not have any adjacent (in horizontal or vertical directions) neighbour(s), the homogeneity level value, preferably the probabilistic local text homogeneity PLTH value of this connected component $CC_i$ can be selected to be a predefined value, preferably zero. In such case, this component $CC_i$ is considered as a non-regular component, preferably a non-text component, more preferably a non-text character.

Advantageously, the document segmentation method based on homogeneity probability (DSHP) described above can be combined with a complementary method for recognizing a binarized document. Preferably, the complementary method is a keyword spotting method, a figure extraction method, a text searching method, or any methods that extract information-of-interest based on the comprehension of the layout of a document image. Even though, the document segmentation with a probabilistic homogeneity approach (DSPH), according to the present disclosure, is recognized as outperforming (ICDAR2019 Competition on Recognition of Documents with Complex Layouts—RDCL2019) other segmentation methods (see table below), a combination of the DSPH method with one of the methods of the table, or any common techniques for document segmentation and layout analysis, or any combination thereof can be foreseen to compensate any possible weaknesses of one of the methods or techniques used. It has been shown that a combination of the method DSPH and some common document processing techniques, such as projection profile analysis, shows a surprising improvement in the discrimination accuracy of text and non-text region, in particular for the recognition of table.

The following table contains a list of document segmentation methods. These methods form the state of the art:

TABLE 3

| | State of the art document segmentation methods |
|---|---|
| BINYAS | a document segmentation method mainly based on connected component analysis and morphology |
| BKZA | a document segmentation method using deep learning to segment page and heuristic algorithms forpost-processing |
| JBM | a document segmentation method using following steps: obtaining segmentation maps from a convolutional neural network (CNN), post-processing based on polygons, OCR (CNN-based) |
| LingDIAR | a document segmentation method based on a multi-task deep network model trained with synthetic document images |
| MHS | a document segmentation method based on following steps: negative/positive image detection, binarization, text/non-text classification, text segmentation, image classification, region refinement + labelling, OCR |
| MICS | A method similar to Pyramid Scene Parsing Network in combination with training on augmented data and final inference/post-processing steps |
| TAQ | a document segmentation method based on following steps: text/non-text classification, text region improvements/smoothing, non-text classification. |
| ZLCW | a document segmentation method using FCN(fully convolutional networks) trained with 15 original training images, augmented to 3960 images (using cropping, gaussian blur, adding random noise as well as colour jittering). FRE11 ABBYY FineReader ™ Engine 11 with PRImA ™ FineReader-to-PAGE wrapper. FRE12 ABBYY FineReader ™ Engine 12 with PRImA ™ FineReader-to-PAGE wrapper. Tess.4 Tesseract ™ 4 with PRImA ™ Tesseract-to-PAGE wrapper |
| LIPADE | a method for complex layout extraction based on features of higher level than pixels obtained from a document straight line based covering catching some information on the dimensions and directions of the objects contained in the binarized document image. |
| CVML | a method first extracts text lines in images, and estimates paragraph structures using the detected text lines. Then, other regions (e.g. separators, pictures) are extracted in non-text regions. |
| AOSM | a hybrid page segmentation method combined top-down and bottom-up approaches. It firstly over-segments page image using a set of white-spaces covering the whole document background. It then groups over-segmented text regions using adaptive parameters. Finally, local context analysis sub-divides (under-segmented) text regions into paragraphs. |
| JU_Aegean | starting point is a combination of pre-processing steps, including conversion to greyscale, contrast stretching, region filling, and binarisation before connected components are analysed to eliminate separators and margins. The resulting image is segmented into horizontal segments based on sufficiently thick horizontal white space. A further step produces an image $I_{large}$ without small components by applying a morphological closing operation with a dynamically chosen structuring element to each horizontal segment. Based on this and the binarized image, a corresponding image $I_{small}$ containing only small components is obtained. The segmentation is then performed by exploiting $I_{large}$ and $I_{small}$. |

This disclosure can be implemented in any programmable platforms/devices/machines where appropriate, such as a computer, a FPGA platform, a DSP platform, a mobile device such as a smart phone or a tablet 5

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the present disclosure is not limited thereto. While various aspects of the exemplary embodiments of this disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments as discussed above are defined by the following numbered clauses:

1. Computer implemented method for segmenting a binarized document comprising the steps of:
extracting a plurality of connected components from the binarized document;
discriminating for at least one of the connected components whether said connected component is a regular component, preferably a text component, more preferably a text character based on a homogeneity level value, wherein the homogeneity level value is representative of the level of homogeneity within the local region of said connected component, wherein the local region comprises said connected component and at least one connected component adjacent to said connected component, wherein the homogeneity level value is based on at least one value representative of at least one image characteristic parameter determined for said connected component and on at least one value representative of the at least one image characteristic parameter determined for the at least one connected component adjacent to said connected component.

2. Method according to clause 1, characterized in that the homogeneity level value for the at least one of the connected components is based on a comparison between the at least one value representative of the at least one image characteristic parameter determined for said connected component and on the at least one value representative of the at least one image characteristic parameter determined for the at least one connected component adjacent to said connected component.

3. Method according to clause 1 or 2, characterized in that the at least one image characteristic parameter for a given connected component comprises at least one morphological feature determined for the given component.

4. Method according to clause 3, characterized in that the at least one morphological feature determined for the given connected component is at least one coordinate of the smallest rectangle containing the region spanned by said component, an aspect ratio of said rectangle, an area of said rectangle, an extent of the binary image of said component, the Euler number of said component, a parameter related to the set of connected components vertically neighboring said component, a parameter related to the set of connected components horizontally neighboring said component, a direction of said component, or any combination thereof.

5. Method according to any preceding clause, characterized in that the at least one image characteristic parameter for a given connected component comprises at least one texture feature determined for the given connected component.

6. Method according to clause 5, characterized in that the at least one texture feature determined for the given connected component is based on a grey-level co-occurrence matrix determined for the given connected component.

7. Method according to clause 6, characterized in that the at least one texture feature determined for the given connected component is computed from a grey-level co-occurrence matrix determined using a region comprising the given connected component and one or more neighboring connected components of the given connected component.

8. Method according to clause 6, characterized in that the at least one texture feature determined for the given connected component is computed from a grey-level co-occurrence matrix determined using a region comprising periodic duplications of the given connected component.

9. Method according to any preceding clause, characterized in that the homogeneity level value is a likelihood that a connected component is a regular component, preferably a text component, more preferably a text character.

10. Method according to any preceding clause, characterized in that the homogeneity level value is a probabilistic description of the homogeneity pattern displayed in a region comprising a connected component and a set of neighboring connected components related to the component.

11. Method according to clause 10, characterized in that the homogeneity level value is evaluated based on a probabilistic cue integration of the at least one image characteristic parameter determined for the at least one of the connected components and the at least one image characteristic parameter determined for the at least one connected component adjacent to the at least one of the connected components.

12. Method according to clause 11, characterized in that the probabilistic cue integration is based on least one prior probability characterizing the cue probability based on the at least one image characteristic parameter determined for the at least one of the connected components and the at least one image characteristic parameter determined for the at least one connected component adjacent to the at least one of the connected components.

13. Method according to clause 11, characterized in that the probabilistic cue integration is based on least one cue-specific distribution characterizing the cue-specific probabilistic homogeneity based on the at least one image characteristic parameter determined for the at least one of the connected components and the at least one image characteristic parameter determined for the at least one connected component adjacent to the at least one of the connected components.

14. Method according to clause 13, characterized in that the at least one cue-specific probabilistic homogeneity is characterized using the Bayesian rule based on the at least one likelihood of observing the at least one image characteristic parameter from the at least one of the connected components and the at least one image characteristic parameter from the at least one connected component adjacent to the at least one of the connected components conditioned on the homogeneity status of the two components.

15. Method according to clause 13, characterized in that the at least one cue-specific probabilistic homogeneity is characterized using the Bayesian rule based on the at least one cue-specific prior probability of the homogeneity between the at least one image characteristic parameter from the at least one of the connected components and the at least one image characteristic parameter from the at least one connected component adjacent to the at least one of the connected components.

16. Method according to any preceding clause, characterized in that a given connected component is discriminated to be a regular component, preferably a text component, more preferably a text character, when the homogeneity level value of the given connected component is higher than a predefined threshold.

17. Method according to any preceding clause, characterized in that a given connected component is discriminated to be a non-regular component, preferably a non-text component, more preferably a non-text character, when the homogeneity level value of the given connected component is below than or equal to the predefined threshold.

18. Method according to any preceding clause, characterized in that an adjacent connected component to a given connected component, is at least a direct vertical neighbor, a direct horizontal neighbor, a secondary horizontal neighbor, or a secondary vertical neighbor.

19. Method according to any preceding clause, characterized in that all the connected components are extracted from the binarized document and then for each connected component extracted, it is discriminated whether said connected component is a regular component, preferably a text component, more preferably a text character.

20. Method according to any preceding clause, characterized in that at least one connected component which is determined as a text component and has the highest homogeneity value among all text components that are yet to be grown into text lines is selected as a seed for forming an initial text structure, preferably a text line.

21. Method according to clause 20, characterized in that during a text line grow iteration, a test determining whether a further connected component is to be added to the text line or not, is performed, said test being based on the comparison of at least one text line parameter representing the level of homogeneity of the text line combined with the further connected component and a given threshold.

22. Method according to clause 21, characterized in that a text block is assembled via grow text line iterations with top-down supervision.

23. Method according to clause 22, characterized in that a text paragraph is extracted by segmenting a text block based on the analysis of geometric location of the text lines within the text block.

24. Method according to any preceding clause, characterized in that a non-text region is extracted via a seed-grow-extraction process.

25. Method according to any preceding clauses, characterized in that the or a text line which has yet to be grown into a text block is selected as a seed for forming an intermediate text structure, preferably a column or a row of a table, using at least one text line parameter and a given threshold.

26. Method according to the preceding clause, characterized in that during an intermediate text structure grow iteration, a test determining whether a further text line is to be added to the intermediate text structure or not, is performed, said test being based on the comparison of at least one intermediate text structure parameter representing the level of homogeneity of the intermediate text structure combined with the further text line and a given threshold.

27. Method according to the preceding clause, characterized in that the intermediate text structure which has yet to be grown into a complex text structure is selected as a seed for forming a complex text structure using at least one parameter of the intermediate text structure and a given threshold.

28. Method according to the preceding clause, characterized in that during a complex text structure grow iteration, a test determining whether a further intermediate text structure is to be added to the complex text structure or not, is performed, said test being based on the comparison of at least one complex text structure parameter representing the level of homogeneity of the complex text structure combined with the further intermediate text structure and a given threshold.

29. Method according to clause 27 or 28, characterized in that the complex structure is a table.

30. Method according to any preceding clauses, characterized in that at least one non-text component which has yet to be grown into a non-text region is selected as a template for forming a or the complex text structure using at least one image characteristic parameter of the non-text component.

31. Method according to the preceding clause, characterized in that the complex text structure being a table, a form, a chart, or a diagram.

32. Method according to any preceding clauses, characterized in that at least one further text structure, preferably a text line or text block, which is contained in, or adjacent to, a region comprising the at least one template, is selected as a template-filling for forming a or the complex text structure.

33. Method according to any preceding clauses, characterized in that during the or a complex text structure grow iteration, a test determining whether a further template is to be added to the or a complex text structure or not, is performed, said test being based on the comparison of the at least one or at least one complex text structure parameter representing the level of homogeneity of the complex text structure combined with the further template and a given threshold.

34. Method according to any preceding clauses, characterized in that during the or a complex text structure grow iteration, a test determining whether a further template-filling is to be added to the or a complex text structure or not, is performed, said test being based on the comparison of the at least one or at least one complex text structure parameter representing the level of homogeneity of the complex text structure combined with the further template-filling and a given threshold.

35. Method for OCRing a binarized document, characterized in that it comprises the steps of segmenting the binarized document according to any preceding clause 1-34.

36. A data processing apparatus comprising means for carrying out the steps of the method according to any of the clauses 1-35.

37. A computer program comprising instructions which, when the program is executed by a computer, cause the computer to carry out the steps of the method according to any of the clauses 1-35.

38. A computer-readable medium comprising instructions which, when executed by a computer, cause the computer to carry out the steps of the method according to any of the clauses 1-35.

The invention claimed is:

1. A computer implemented method for segmenting a binarized document, the method comprising the steps of:
    extracting a plurality of connected components from the binarized document; and
    discriminating for at least one connected component of the plurality of connected components whether the at least one connected component of the plurality of connected components is a regular component based on a homogeneity level value, wherein the homogeneity level value is representative of a level of homogeneity within a local region, wherein the local region comprises the at least one connected component and at least one further connected component adjacent to the at least one connected component, wherein the homogeneity level value of the local region associated with the at least one connected component is calculated based on at least both (a) at least one first value representative of at least one image characteristic parameter determined for the at least one connected component and (b) at least one second value representative of the at least one image characteristic parameter determined for the at least one further connected component adjacent to the at least one connected component.

2. The computer implemented method according to claim 1, wherein the homogeneity level value for the at least one connected component is based on a comparison between the at least one first value and the at least one second value.

3. The computer implemented method according to claim 1, wherein the at least one image characteristic parameter for the at least one connected component comprises at least one morphological feature determined for the respective connected component.

4. The computer implemented method according to claim 3, wherein the at least one morphological feature includes one or more of:
at least one coordinate of a smallest rectangle containing the region spanned by the component, an aspect ratio of the rectangle, an area of the rectangle, an extent of a binary image of the respective connected component, an Euler number computed as one minus the number of holes of the respective connected component, a parameter related to a set of the plurality of connected components vertically neighboring the respective connected component, a parameter related to the plurality of connected components horizontally neighboring the respective connected component, and a direction of the respective connected component.

5. The computer implemented method according to claim 1, wherein the at least one image characteristic parameter for the at least one connected component comprises at least one texture feature determined for the at least one connected component.

6. The computer implemented method according to claim 5, wherein the at least one texture feature is based on a grey-level co-occurrence matrix determined for the at least one connected component.

7. The computer implemented method according to claim 6, wherein the at least one texture feature is computed from a grey-level co-occurrence matrix determined using a region comprising the respective connected component and one or more neighboring connected components of the respective connected component.

8. The computer implemented method according to claim 6, wherein the at least one texture feature is computed from a grey-level co-occurrence matrix determined using a region comprising periodic duplications of the respective connected component.

9. The computer implemented method according to claim 1, wherein the homogeneity level value is a likelihood that the at least one connected component is a regular component.

10. The computer implemented method according to claim 1, wherein the homogeneity level value is a probabilistic description of a homogeneity pattern displayed in a region comprising the at least one connected component and a set of neighboring connected components related to the at least one connected component.

11. The computer implemented method according to claim 10, wherein the homogeneity level value is evaluated based on a probabilistic cue integration of the at least one image characteristic parameter determined for the at least one connected component and the at least one image characteristic parameter determined for the at least one further connected component.

12. The computer implemented method according to claim 1, wherein the at least one connected component is discriminated to be a regular component when the homogeneity level value of the respective connected component is higher than a predefined threshold.

13. The computer implemented method according to claim 1, wherein the at least one connected component is discriminated to be a non-regular component when the homogeneity level value of the respective connected component is below than or equal to a predefined threshold.

14. The computer implemented method according to claim 1, wherein an adjacent connected component adjacent to the at least one connected component is at least one of: a direct vertical neighbor, a direct horizontal neighbor, a secondary horizontal neighbor, and a secondary vertical neighbor.

15. A method for performing optical character recognition of a binarized document, comprising segmenting the binarized document according to claim 1, wherein the regular component comprises a text character.

16. A non-volatile computer-readable medium, comprising instructions which, when executed by a computer, cause the computer to carry out the steps of the method according to claim 1.

17. A computer implemented method for segmenting a binarized document, the method comprising the steps of:
extracting a plurality of connected components from the binarized document; and
discriminating for at least one connected component of the plurality of connected components whether the at least one connected component of the plurality of connected components is a regular component based on a homogeneity level value,
wherein the homogeneity level value is representative of a level of homogeneity within a local region, wherein the local region comprises the at least one connected component and at least one further connected component adjacent to the at least one connected component,
wherein the homogeneity level value is determined based on a probabilistic cue integration of at least one first value representative of at least one image characteristic parameter determined for the at least one connected component and on at least one second value representative of the at least one image characteristic parameter determined for the at least one further connected component adjacent to the at least one connected component,
wherein the probabilistic cue integration is based on at least one prior probability characterizing a cue probability.

18. A computer implemented method for segmenting a binarized document, the method comprising the steps of:
extracting a plurality of connected components from the binarized document; and
discriminating for at least one connected component of the plurality of connected components whether the at least one connected component of the plurality of connected components is a regular component based on a homogeneity level value,
wherein the homogeneity level value is representative of a level of homogeneity within a local region, wherein the local region comprises the at least one connected component and at least one further connected component adjacent to the at least one connected component, wherein the homogeneity level value is determined based on a probabilistic cue integration of at least one first value representative of at least one image characteristic parameter determined for the at least one connected component and on at least one second value representative of the at least one image characteristic parameter determined for the at least one further connected component adjacent to the at least one connected component, wherein the probabilistic cue integration is based on at least one cue-specific distribution characterizing a cue-specific probabilistic homogeneity.

19. The computer implemented method according to claim 18, wherein the at least one cue-specific probabilistic homogeneity is determined utilizing the Bayesian rule based on a likelihood of observing the at least one image characteristic parameter determined for the at least one connected component and the at least one image characteristic parameter determined for the at least one further connected component conditioned on a homogeneity status of the at least one connected component and the at least one further connected component.

20. The computer implemented method according to claim 18, wherein the at least one cue-specific probabilistic homogeneity is determined utilizing the Bayesian rule based on a cue-specific prior probability of a homogeneity between the at least one image characteristic parameter determined for the at least one connected component and the at least one image characteristic parameter determined for the at least one further connected component.

\* \* \* \* \*